United States Patent [19]

Hagen et al.

[11] 3,978,342
[45] Aug. 31, 1976

[54] DUAL MODE RADIATION TRANSMITTING APPARATUS

[75] Inventors: James M. Hagen, Riverside; Roger C. Farmer, Glendora, both of Calif.

[73] Assignee: Xerox Corporation, Stamford, Conn.

[22] Filed: Apr. 7, 1975

[21] Appl. No.: 565,513

[52] U.S. Cl. .............................. 250/495; 250/494; 250/493
[51] Int. Cl.² ........................................... G01J 1/00
[58] Field of Search ........... 250/493, 494, 495, 503, 250/504; 350/1, 6, 7

[56] References Cited
UNITED STATES PATENTS

| | | | |
|---|---|---|---|
| 3,710,098 | 1/1973 | Walden | 350/7 |
| 3,750,189 | 7/1973 | Flischer | 350/7 |

*Primary Examiner*—Alfred E. Smith
*Assistant Examiner*—B. C. Anderson
*Attorney, Agent, or Firm*—James J. Ralabate; Franklyn C. Weiss; Irving Keschner

[57] ABSTRACT

Radiation transmitting apparatus which is smaller, lighter and less expensive than prior art systems, provides approximately 360° azimuthal coverage and has the capability of operating in an infrared countermeasure mode when in a hostile area and as a collision avoidance beacon when in a non-hostile area. In particular, a rotatable reflector is positioned adjacent a fixed infrared source within a protective member capable of being mounted to an object to be protected, such as a helicopter. In the infrared countermeasure mode of operation, the reflector is rotated at a first angular velocity. An infrared filter is positioned relative to the infrared source and the rotating reflector whereby only infrared radiation is transmitted through the protective member. In the collision avoidance mode, the reflector is rotated at a second angular velocity, less than the first angular velocity, and the infrared filter is positioned relative to the infrared source and the rotating reflector whereby visible and infrared radiation generated by the infrared source is transmitted through the protective member.

22 Claims, 8 Drawing Figures

DUAL MODE RADIATION TRANSMITTING APPARATUS

BACKGROUND OF THE INVENTION

Concurrently with the advance in weaponry which rely on detecting infrared radiation emanating from the object to be intercepted, infrared countermeasures (IRCM) devices using infrared technology have been fabricated to counter (render ineffective) the aforementioned weaponry. For example, as is well known, heat seeking missiles, whether launched from aircraft or from the ground, usually track the object by scanning the infrared radiation emitted therefrom. Helicopters and aircraft, for example, have been adapted to incorporate equipment which emit pulsed infrared radiation over a wide field of view, the heat seeking missile being confused by the pulsed infrared radiation and no longer able to track the real target. However, one of the prime functions of any IRCM device is that it be light weight, relatively inexpensive and provide a fairly large azimuthal coverage. Further, it would be desirable if the IRCM device can be utilized in an alternate, or dual mode, configuration. For example, obvious efficiencies would occur if the IRCM device could be utilized as a collision avoidance beacon in addition to a countermeasure mode.

prior art countermeasure technology has employed light systems wherein a rotating infrared source is electronically pulsed, pulses of infrared radiation being emitted to the adjacent environment. However, these prior art systems generally fail to provide the characteristics of light weight, small size, low cost and large azimuthal coverage required for an effective IRCM device.

Further, it would be desirable if the IRCM device would have an alternate, or dual mode, capability for reasons of efficiency, reduced cost, etc. For example, an IRCM device mounted to a helicopter or aircraft should preferably have the capability of operating in the IRCM mode when in a hostile area and as a collision avoidance beacon in a non-hostile area.

SUMMARY OF THE PRESENT INVENTION

The present invention provides radiation transmitting apparatus which is smaller, lighter weight and less expensive than prior art systems, provides approximately 360° azimuthal coverage and has the capability of operating in an infrared countermeasure mode when in a hostile area and as a collision avoidance beacon when in a non-hostile area. In particular, a rotatable reflector is positioned adjacent a fixed infrared source within a protective member capable of being mounted to an object to be protected, such as a helicopter. In the infrared countermeasure mode of operation, the reflector is rotated at a first angular velocity. An infrared filter is positioned relative to the infrared source and the rotating reflector whereby only infrared radiation is transmitted through the protective member. In the collision avoidance mode, the reflector is rotated at a second angular velocity, less than the first angular velocity, and the infrared filter is positioned relative to the infrared source and the rotating reflector whereby the visible and infrared radiation generated by the infrared source is transmitted through the protective member.

It is an object of the present invention to provide apparatus for selectively transmitting infrared and visible radiation.

It is a further object of the present invention to provide radiation transmitting apparatus having a dual mode capability, the first, or infrared coutermeasure mode, transmitting infrared radiation and the second, or collision avoidance beacon mode, transmitting visible and infrared radiation.

It is still a further object of the present invention to provide infrared countermeasure apparatus for protecting objects from infrared radiation seeking devices.

It is an object of the present invention to provide infrared radiation transmitting apparatus which is smaller, lighter and less expensive than prior art systems, provides a 360° azimuthal coverage and has the capability of operating in the infrared countermeasure mode when in a hostile area and as a collision avoidance beacon when in a non-hostile area. In particular, a rotatable reflector is positioned adjacent a fixed infrared source within a protective member capable of being mounted to a device to be protected, such as a helicopter. In the infrared countermeasure mode of operation, the reflector is rotated at a first angular velocity. An infrared filter is positioned relative to the infrared source and the rotating reflector whereby only infrared radiation is transmitted through the protective member. In the collision avoidance mode, the reflector is rotated at a second angular velocity, less than the first angular velocity, and the infrared filter is positioned relative to the infrared source and the rotating reflector whereby the visible and infrared radiation generated by the infrared source is transmitted through the protective member.

DESCRIPTION OF THE DRAWINGS

For a better understanding of the invention, as well as other objects and further features thereof, reference is made to the following description which is to be read in conjunction with the accompanying drawings wherein.

DESCRIPTION OF THE PREFERRED EMBODIMENTS

Figure 1:
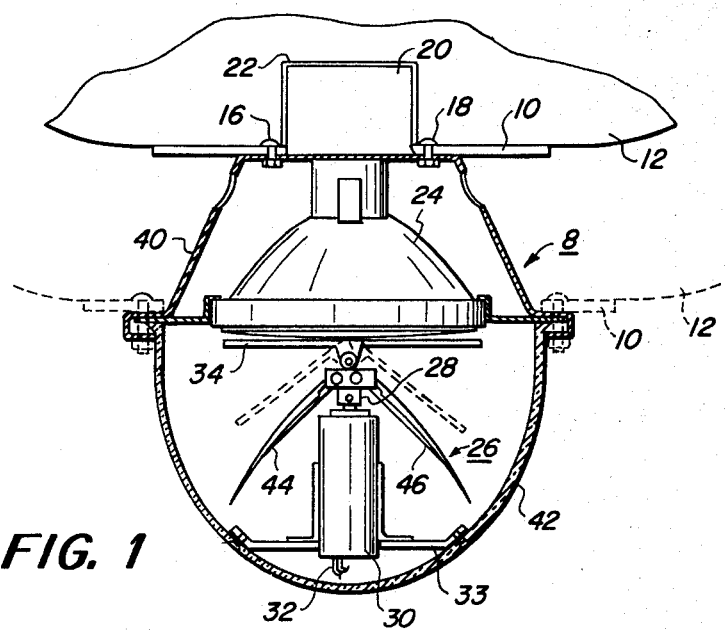
FIG. 1 is a sectional view of the radiation generating apparatus of the present invention.
Figure 2:
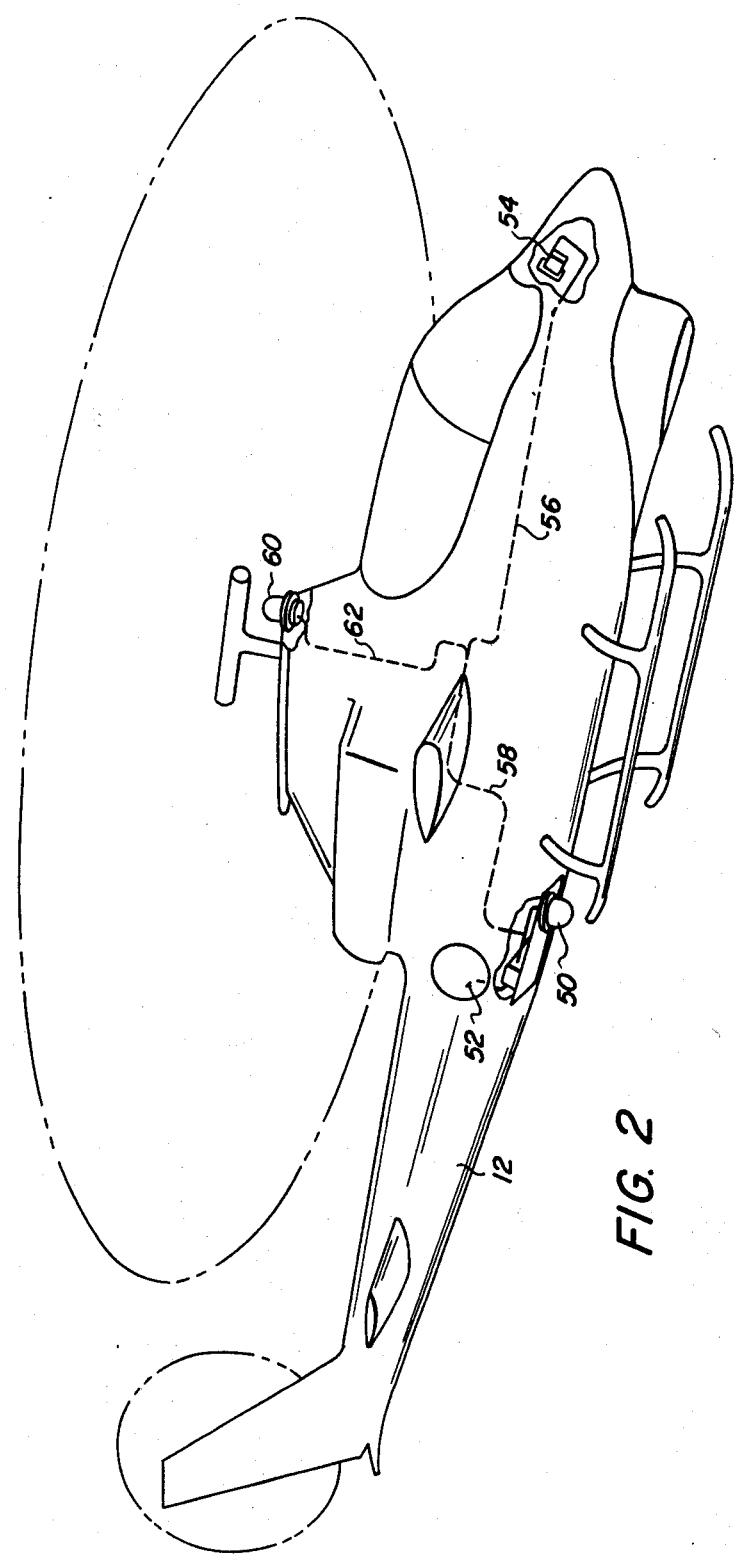
FIG. 2 is a diagrammatic view of a helicopter employing the apparatus of the present invention in two positions.

Referring now to FIG. 1, a mounting plate 10 is provided to secure the radiation transmitting apparatus 8 of the present invention to a helicopter or aircraft 12, apparatus 8 being mounted to the helicopter via bolts 16 and 18. As shown in the figure, bolts 16 and 18 also secure upper portion 20 of apparatus 8 to the helicopter 12, portion 20 being positioned in aperture 22 formed in the helicopter frame. It should be noted that apparatus 8 can be mounted to the helicopter at alternate positions, such as the position illustrated in phantom in the figures. An infrared lamp 24, such as a 450 watt military specification landing light, manufactured by General Electric Company, is supported by lamp housing 20, lamp 24 being connected to a suitable power supply (not shown). A rotatable reflector 26 is operatively coupled to the drive shaft 28 of motor 30. The motor 30 is energized via control cable 32 which is coupled to a control panel situated within the helicopter or aircraft, as shown in FIG. 2. As set forth in more detail hereinafter, reflector 26 is driven at a variable rotational speed dependent upon the operational mode as set forth hereinabove, i.e., either as an infrared countermeasure device or as a collision avoidance beacon. An infrared filter 34 is coupled to the reflecting mirror 26 in a manner whereby the filter is in a substantially horizontal position, as shown, adjacent lamp 24 when the reflector 26 is driven at a first angular velocity in the infrared countermeasure mode of operation whereby the visible radiation generated by the lamp 18 is absorbed. In the collision avoidance beacon mode, motor 30 is driven at a lower speed and infrared filter 34 is positioned as shown in phantom such that the visible radiation generated by lamp 24 is directed to reflecting mirror 26.

The lamp 24 is supported in the upper portion 40 of the apparatus and motor 30 is supported to the lower, or dome, portion 42 by motor drive chassis 33 as shown. In accordance with conventional practice, dome 42 is made of material transparent to both infrared and visible radiation.

In operation, the pilot of the helicopter or aircraft 12, after determining whether they are in a hostile or non-hostile area, will adjust the rotational speed of drive shaft 28 via cable 32 accordingly. For example, in the infrared countermeasure operational mode, reflecting mirror 26 is driven at 400 revolutions per minute (corresponding to 800 revolutions per minute since reflecting mirror 26 comprises two reflecting sections 44 and 46), a rate corresponding to the generation of approximately 12.5 radiation pulses per second. The frequency of the pulsed radiation is determined by the speed of the motor shaft, the pulse height and width being determined by the surface contour and characteristics of the reflecting mirror 26. The particular frequency utilized is pilot selected to correspond to that necessary to avoid heat seeking missiles. However, the only limitation on the minimum speed in this mode is that it be sufficient to cause infrared filter 34 to be positioned to absorb the visible light emanating from lamp 24. The 12.5 infrared pulses per second are transmitted to the surrounding area through dome 42.

The second mode of operation is initiated when the pilot determines that he is in a non-hostile area and that a collision avoidance beacon is required. If this is the case, the rotational speed of drive shaft 28 is reduced to below the minimum speed required to maintain infrared filter 34 in the extended or visible light absorbing position, filter 34 assuming the position as shown in phantom. This allows visible and infrared radiation to be reflected from reflecting mirror 26 through dome 42 to the surrounding area.

Since an approved FAA approved collision avoidance beacon requires a visible light pulse rate of two pulses per second, drive shaft 28, in a preferred embodiment is driven at sixty revolutions per minute, corresponding to the aforementioned pulse rate.

FIG. 2 illustrates the apparatus of the present invention mounted at two positions to the helicopter 12. The simplified view shows radiation transmitters 50 and 60 mounted to the bottom and top, respectively, of helicopter 12, providing an azimuth angle of approximately 360°. A lead 52 from within the helicopter provides the input power to transmitter 50, the pilot controlling the rotational speed of the reflecting mirror drive shaft via control panel 54 and leads 56 and 58. Control panel 54 and leads 56 and 62 control the rotational speed of the drive shaft of transmitter 60.

Obviously, additional transmitters can be located in other locations to extend the coverage of the transmitted radiation pulses.

Figure 3:
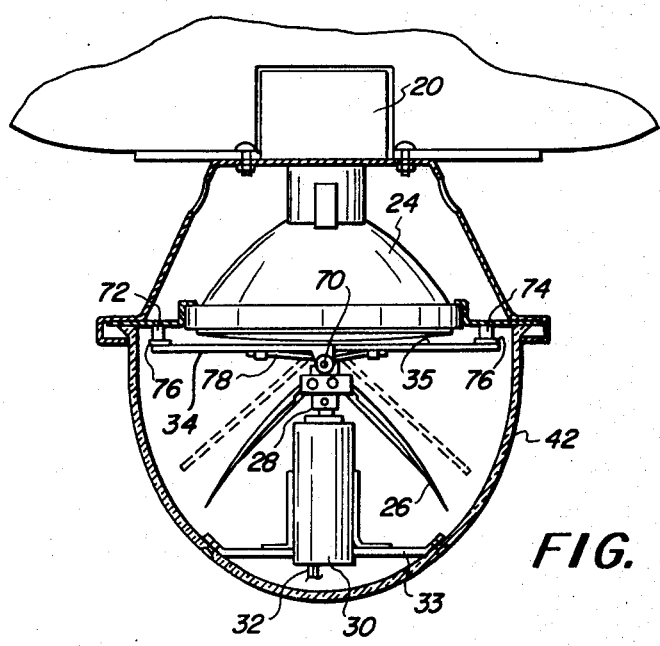
FIG. 3 is a sectional view of a first embodiment of apparatus for positioning the infrared reflector in the infrared countermeasure and collision avoidance beacon modes of operation.

FIG. 3 illlustrates one embodiment for positioning infrared filter 34 to correspond to either the infrared or visible radiation generating mode of operation.

The infrared reflecting filter 34, having a dichroic layer 35 thereon which is transparent to (transmits) infrared radiation and opaque to (reflects) visible radiation, is pivotable about pin 70. In the infrared radiation generating mode of operation, filter 34 is positioned as shown. In particular, surface 35 is supported adjacent to supporting members 72 and 74. In the preferred embodiment, surface 35 is in direct contact with supporting member 72 or via pad 76, for example, interposed between surface 35 and support member 72. Therefore, when in the infrared radiation generation mode of operation, support member 72 (and pad 76) inhibit visible radiation from leaking to the outside environment or being transmitted thereto via reflector 26.

In the infrared radiation generating mode, motor 30 is energized by the pilot in a manner whereby drive shaft 28 is driven at a high angular velocity. Filter 34, mounted to drive shaft 28, is configured in a manner such that when drive shaft 28 is driven at the high angular velocity, filter 34 is driven, by centripetal force, to the extended position shown. In this position, the visible radiation generated by source 24 is reflected back into the source enclosure by the filter 34, the infrared radiation transmitted by source 24 being transmitted through the protective member 42.

In the visible radiation generating mode, motor 30 is energized by the pilot in a manner whereby drive shaft 28 is driven at a lower angular velocity. Filter 34, rotating at the lower velocity, is forced, by bias spring 78 (shown in a representative form) to the position shown in phantom, the return force of the spring being greater than the centripetal force at the lower speed. In this position (adjacent reflecting mirror 26), the visible radiation generated by source 24 is reflected by dichroic surface 35 through the protective member 42, the infrared radiation generated by source 24 also being transmitted through protective member 42. In this mode, the infrared radiation is transmitted through layer 35 and reflected back through filter 34 after the infrared radiation strikes the surface of reflecting mirror 26.

The surface 35 of filter 34 is highly transparent to infrared radiation but is highly reflective to visible radiation, the surface of reflecting mirror 26 being highly reflective of both visible and infrared radiation. Since surface 35 separates radiation of two different wavelengths, it has been referred to as a dichroic surface.

Figure 4:
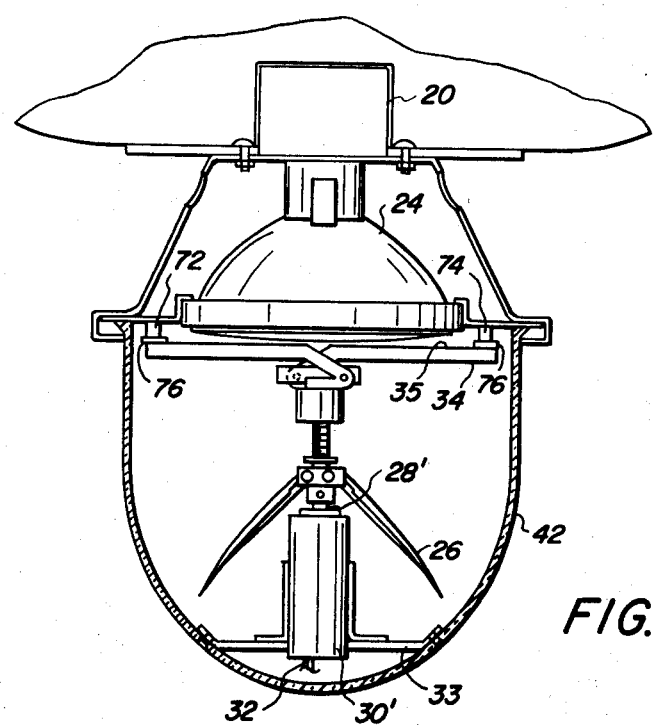
FIG. 4 is a sectional view of a second embodiment of apparatus for positioning the infrared reflector in the infrared countermeasure and collision avoidance beacon modes of operation.

FIG. 4 illustrates a second embodiment of apparatus for automatically positioning the infrared filter 34 to the infrared countermeasure mode (infrared radiation) or collision avoidance beacon (visible radiation) modes dependent upon the angular velocity of drive shaft 28'. (It should be noted at this point that identical elements in each of the figures have been represented by the same reference numeral). Motor 30' is bidirectional wherein a positive polarity voltage input will drive shaft 28' in a first direction whereas a negative polarity voltage input will drive shaft 28' in a direction opposite to the first direction. The filter drive mechanism includes a threaded shaft and sleeve mechanism (shown in detail in FIGS. 5 and 6), rotation of shaft 28' in a first, or clockwise direction, causing filter 34 to be positioned as shown in FIG. 5 whereby rotation of drive shaft 28' in the opposite or counterclockwise direction causes the sleeve mechanism to move down the threaded shaft to lower the filter 34 to the position shown in FIG. 6.

In the infrared radiation generating mode, motor 30' is energized by the pilot in a manner whereby drive shaft 28' is driven in a first (for example, clockwise) direction at a predetermined angular velocity whereby filter 34 is driven to the substantially horizontal position shown in the figure. In this position, the visible radiation generated by the infrared source (not shown in this figure) is reflected back into the source cavity by dichroic surface 35, infrared radiation being transmitted through the protective member 42 as described with reference to FIG. 1.

In the visible radiation generating mode, motor 30' is energized by the pilot in a manner whereby drive shaft 28' is driven in an opposite (i.e., counter-clockwise) direction at an angular velocity less than the first angular velocity whereby filter 34 is driven to a position wherein the visible radiation generated by the infrared source 24 is reflected by dichroic surface 35 of filter 34 through the protective member 42, the infrared radiation generated by source 24 also being transmitted through protective member 42 as set forth hereinabove with reference to FIG. 3.

Figure 5:
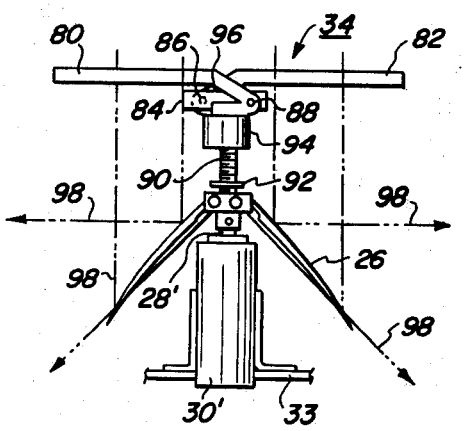
FIGS. 5 and 6 are sectional views of that portion of the apparatus shown in FIG. 4 used for positioning the infrared reflector in the infrared countermeasure and collision avoidance beacon modes of operation, respectively.
Figure 6:
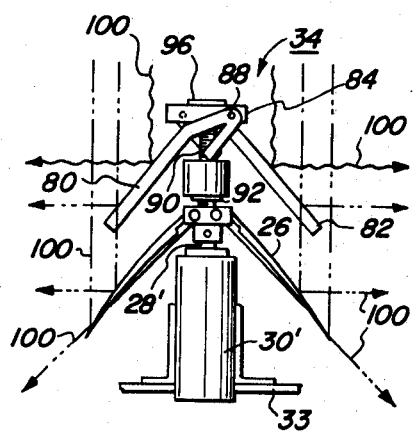

FIGS. 5 and 6 show detailed views of the infrared filter and the portion of the FIG. 4 apparatus for moving it to positions corresponding to the infrared countermeasure and collision avoidance beacon modes of operation.

Infrared filter 34 comprises a pair of arms 80 and 82 each having a horizontal portion and an angled portion as shown. Arms 80 and 82 are rotatably mounted to a support member 84 by means of pivot pins 86 and 88 inserted through apertures formed in arms 80 and 82. It should be noted that this construction for filter 34 is utilized in the embodiments shown in FIGS. 1, 3 and 4.

As set forth hereinabove with reference to the FIG. 4 embodiment, motor 30' drives shaft 28' in either a clockwise or counter-clockwise direction which causes reflector 26 to be correspondingly rotated. In order to move filter arms 80 and 82 to the substantially horizontal position as shown in FIG. 5 (corresponding to the infrared countermeasure mode), a threaded shaft 90, having a stop member 92 affixed thereon, is formed as an extension of shaft 28'. The threaded extension 90 is inserted into threaded sleeve 94 to form an operative relationship therebetween. In the position shown, the upper surface of sleeve 94 abuts against the lower surface of each arm. A stop member 96 is affixed to the end of shaft 90 to limit the vertical, upward movement of sleeve 94.

In operation, when motor 30' is energized to drive shaft 28' (and threaded shaft 90) in the clockwise direction, sleeve 94 is driven in the upward direction until the lower portion of arms 80 and 82 are forced against stop member 96. In this manner, arms 80 and 82 are caused to extend in the horizontal direction and only the infrared rays 98 emitted by lamp 24 (FIG. 4) are transmitted to reflector 26 and reflected therefrom through protective member 42.

FIG. 6 illustrates the situation wherein motor 30' is energized to drive shaft 28' (and threaded shaft 90) in the counter-clockwise direction, sleeve 94 thereby being driven to its lowest position on shaft 90 as determined by stop member 92. When sleeve 94 reaches this position (shown in the figure), arms 80 and 82 have been rotated downwardly about their respective pivot points by gravity (or by a bias spring) to assume the position corresponding to the collision avoidance beacon mode of operation. In this position, the visible light rays 100 emitted from lamp 24 are transmitted to reflector 26 and reflector 34 and reflected therefrom through protective member 42 (FIG. 4).

Figure 7:
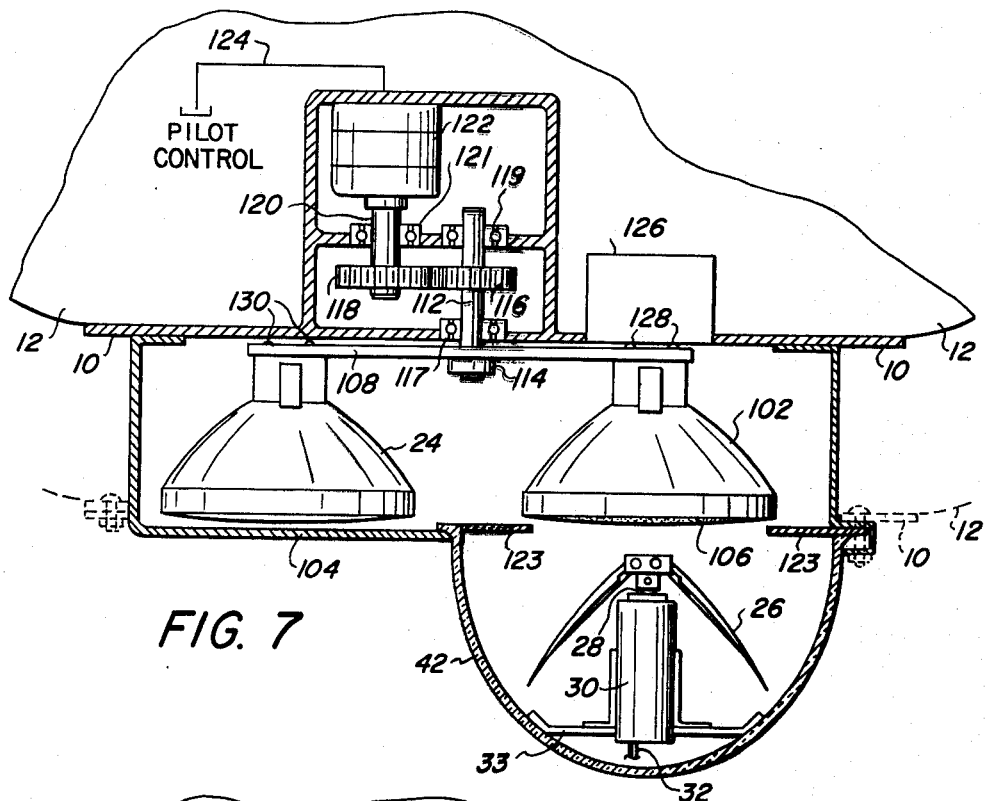
FIGS. 7 and 8 are partial sectional views of further apparatus for generating either infrared or visible radiation.

Referring now to FIG. 7, apparatus which provides the capability for generating either infrared or visible radiation, corresponding to the infrared countermeasure or collision avoidance beacon modes of operation, respectively, is shown. In particular, two landing lights 24 and 102 are supported within frame member 104 as shown. Frame member 104 is mounted to object 12, such as a helicopter, in a conventional manner. A layer 106 of infrared reflecting material is coated on the face of lamp 102 to inhibit the visible light emitted from the lamp while transmitting the infrared radiation emitted therefrom. Lamps 24 and 102 are mounted to a common support arm 108 as shown. A gear shaft 112 is secured to support arm 108 by means of securing member 114. Gear shaft 112 is journaled for rotation in bearing members 117 and 119, gear 118 being affixed to shaft 112 as shown. A drive shaft 120, journaled for rotation in bearing member 121, is driven by motor 122. Gear 118, affixed to drive shaft 120 as shown, is mounted to operatively engage gear 116. Radiation baffles 123 are provided to inhibit radiation leakage through protective member 42.

The apparatus shown in FIG. 7 operates as follows: in the infrared countermeasure mode of operation motor 30 drives shaft 28 at a first speed sufficient to cause reflector 26 to generate a train of infrared radiation pulses of a desired frequency in the manner as set forth hereinabove. In this mode, a signal, through pilot intervention, is applied to lead 124 which positions lamp 102 in a manner whereby the infrared radiation emitted from the lamp will be incident on reflector 26 as shown in the figure. In this case, the infrared radiation emitted by lamp 102, when energized by lamp controller 26 via contact 128, reflects the radiation to the outside environment via protective member 42.

Figure 8:
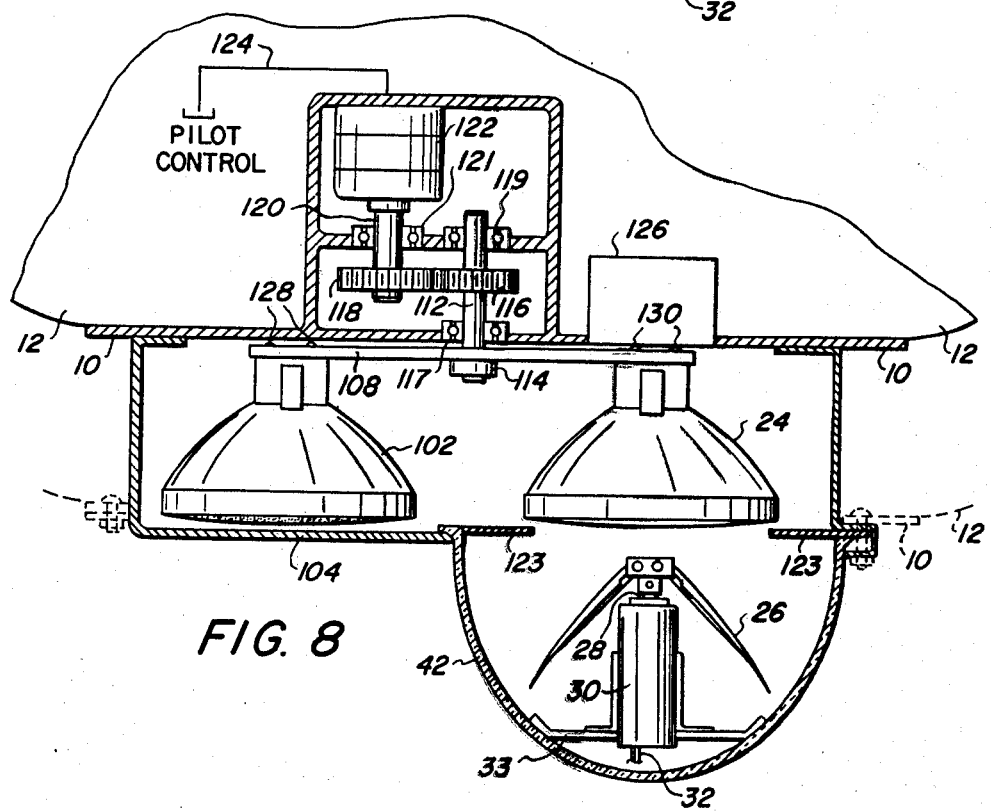

In the visible radiation generating mode, motor 30 drives shaft 28 at a speed lower than the shaft speed in the infrared countermeasure mode of operation. In this mode, a signal, through pilot intervention, is applied to lead 124. The signal on lead 124 appropriately energizes motor 122, shaft 120 and gears 116 and 118 to cause support arm 108 to rotate to position lamp 24 in a manner whereby the visible radiation emitted from the lamp will be incident on reflector 26 as shown in FIG. 8 whereas the infrared radiation generated by lamp 102 is prevented from being transmitted to the outside environment by frame member 104. In this case, the visible light emitted by lamp 24 when energized by lamp controller 126 via contacts 130 is directed to rotating reflector 26 which reflects the radiation to the outside environment via protective member 42.

While the invention has been described with reference to its preferred embodiments, it will be understood by those skilled in the art that various changes may be made and equivalents substituted for elements thereof without departing from the true spirit and scope of the invention. In addition, many modifications may be made to adapt a particular situation or material to the teaching of the invention without departing from its essential teachings.

What is claimed is:

1. Apparatus for transmitting radiation to a remote location comprising:
    a stationary source of infrared radiation,
    means for energizing said source of radiation,
    a motor driven rotary scanning means positioned adjacent said infrared source,
    means for selectively driving said rotary scanning means at either a first or second angular velocity, and
    an infrared filter operably associated with said rotary scanning means, said infrared filter inhibiting the visible light emanating from said infrared radiation source from being transmitted to a remote location by said rotary scanning means when said rotary scanning means is driven at said first angular velocity and allowing the visible light emanating from said infrared radiation source to be transmitted to said remote location by said rotary scanning means when said rotary scanning means is driven at said second angular velocity.

2. The apparatus as defined in claim 1 wherein said infrared filter is moved to a first position between said source of infrared radiation and said rotary scanning means when said rotary scanning means is driven at said first angular velocity, whereby the visible radiation emanating from said source of infrared radiation is prevented from being directed to said rotary scanning means while the infrared radiation emanating from said infrared radiation source is reflected from said rotary scanning means to said remote location.

3. The apparatus as defined in claim 2 wherein said infrared filter is moved to a second position between said source of infrared radiation and said rotary scanning means when said rotary scanning means is driven at said second angular velocity, whereby the visible radiation emanating from said source of infrared radiation is directed to said rotary scanning means and reflected therefrom to said remote location.

4. The apparatus as defined in claim 3 wherein said infrared filter comprises a dichroic member, said dichroic member being reflective to visible radiation and transparent to infrared radiation.

5. The apparatus as defined in claim 3 wherein said first angular velocity is greater than said second angular velocity.

6. The apparatus as defined in claim 5 wherein said rotary scanning means transmits pulses of the radiation incident thereon to said remote location, the radiation pulse rate being dependent upon the angular velocity of said rotary scanning means.

7. Apparatus for selectively transmitting either infrared or visible radiation to a remote location comprising:
    a source of infrared radiation adjacent said source of infrared radiation, said rotating scanning means being driven at either a first or second angular velocity.
    an infrared filter operably associated with said scanning means, and
    means for driving said rotary scanning means at either said first or second angular velocity, said infrared filter being moved to a first position adjacent said source of infrared radiation when said rotary scanning means is driven at said first angular velocity whereby visible radiation emanating from said source of infrared radiation is not incident upon said rotary scanning means, said infrared filter being moved to a second position between said source of infrared radiation and said rotary scanning means when the rotary scanning means is driven at said second angular velocity whereby visible radiation emanating from said source of infrared radiation is directed to said rotary scanning means and reflected thereby to said remote location.

8. The apparatus as defined in claim 7 wherein said infrared filter comprises a dichroic member, said dichroic member being reflective to visible radiation and transparent to infrared radiation.

9. The apparatus as defined in claim 8 further including a member for partially enclosing said source of infrared radiation whereby radiation emanating therefrom is directed towards said rotary scanning means.

10. The apparatus as defined in claim 9 wherein said source of infrared radiation is completely enclosed when said infrared filter is moved to said first position.

11. The apparatus as defined in claim 10 wherein said first angular velocity is greater than said second angular velocity.

12. The apparatus as defined in claim 11 wherein said rotary scanning means transmits pulses of the radiation incident thereon to said remote location, the radiation pulse rate being dependent upon the angular velocity of said rotary scanning means.

13. Apparatus for selectively transmitting either infrared or visible radiation to a remote location, said apparatus being adapted to be mounted to a helicopter or aircraft whereby the helicopter or aircraft can operate in the infrared countermeasure mode when infrared radiation is being transmitted or in the collision avoidance beacon mode when visible radiation is being transmitted, said apparatus comprising:
    a source of infrared radiation,
    means for energizing said source of radiation,
    a motor driven rotating scanning means positioned adjacent said source of infrared radiation, said rotating scanning means being driven at either a first or second angular velocity,
    an infrared filter operably associated with said scanning means, and
    means for driving said rotary scanning means at either said first or second angular velocity, said infrared filter being moved to a first position adjacent said source of infrared radiation when said rotary scanning means is driven at said first angular velocity whereby visible radiation emanating from said source of infrared radiation is not incident upon said rotary scanning means, said infrared filter being moved to a second position between said source of infrared radiation and said rotary scanning means when the rotary scanning means is driven at said second angular velocity whereby visible radiation emanating from said source of infrared radiation is directed to said rotary scanning means and reflected thereby to said remote location.

14. The apparatus as defined in claim 13 wherein said infrared filter comprises a dichroic member, said dichroic member being reflective to visible radiation and transparent to infrared radiation.

15. The apparatus as defined in claim 14 further including a member for partially enclosing said source of infrared radiation whereby radiation emanating therefrom is directed towards said rotary scanning means.

16. The apparatus as defined in claim 15 wherein said source of infrared radiation is completely enclosed when said infrared filter is moved to said first position.

17. The apparatus as defined in claim 16 wherein said first angular velocity is greater than said second angular velocity.

18. The apparatus as defined in claim 17 wherein said rotary scanning means transmits pulses of the radiation incident thereon to said remote location, the radiation pulse rate being dependent upon the angular velocity of said rotary scanning means.

19. Apparatus for selectively transmitting either infrared or visible radiation to a remote location comprising:
 a housing,
 a source of infrared radiation positionable to either a first or second portion of said housing, said infrared radiation source having an infrared filter operatively associated therewith to inhibit the transmission of visible light generated by said source,
 a source of visible light positionable to either a first or second portion of said housing,
 a motor driven rotating scanning means positioned within said first portion of said housing and adjacent said source of infrared radiation, said rotating scanning means being driven at either a first or second angular velocity,
 means for moving said sources of infrared radiation and visible light to either said first or second housing portions, said source of infrared radiation being in said first portion when said source of visible light is in said second portion and in said second housing portion when said source of visible light is in said second housing portion, and
 means for driving said rotary scanning means at either said first or second angular velocity, said source of infrared radiation being moved to said first housing portion when said rotary scanning means is driven at said first angular velocity whereby visible radiation emanating from said source of infrared radiation is not incident upon said rotary scanning means while infrared radiation emanating from said infrared source is directed to said rotary scanning means and reflected thereby to said remote location, said source of visible light being moved to said first housing portion when the rotary scanning means is driven at said second angular velocity whereby visible light emanating from said source of visible light is directed to said rotary scanning means and reflected thereby to said remote location.

20. The apparatus as defined in claim 19 wherein said first angular velocity is greater than said second angular velocity.

21. The apparatus as defined in claim 20 wherein said rotary scanning means transmits pulses of the radiation incident thereon to said remote location, the radiation pulse rate being dependent upon the angular velocity of said rotary scanning means.

22. The apparatus as defined in claim 19 further including means for only energizing the source positioned in said first housing portion.

* * * * *